Figure 1:
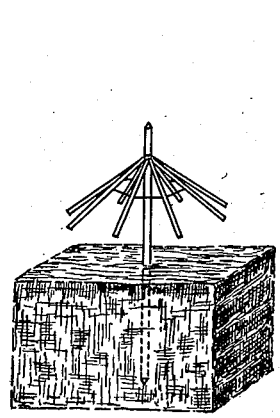

June 19, 1923.

H. KRANTZ 1,459,059

PROCESS FOR REFINING ORGANIC MATTER USED AS MANURE

Filed July 3, 1922

INVENTOR

Hermann Krantz

Patented June 19, 1923.

1,459,059

UNITED STATES PATENT OFFICE.

HERMANN KRANTZ, OF MEMMINGEN, GERMANY.

PROCESS FOR REFINING ORGANIC MATTER USED AS MANURE.

Application filed July 3, 1922. Serial No. 572,599.

*To all whom it may concern:*

Be it known that I, HERMANN KRANTZ, a citizen of Germany, residing at Memmingen, Bayern, Germany, have invented certain new and useful Improvements in a Process for Refining Organic Matter Used as Manure; and I do hereby declare the following to be a full, clear, and exact description of the invention, such as will enable others skilled in the art to which it appertains to make and use the same.

It was hitherto quite usual to store farmyard manure without subjecting it to any kind of treatment from its origin to the time it was spread on the soil. Under the best of circumstances it was spread out on the manure enclosure after being removed from the stable, and cattle were then allowed to tread on it. This was done for storage purposes, but had as a result that the plant nutrients in the manure were more or less wasted. For instance, almost a third of the original proportion of nitrogen was lost on the dung-heap and only a quarter of the remaining two-thirds brought on the field was recovered in the form of increased field production. The total loss of nitrogen was thus considerable, and so was that of carbon; the loss of valuable ashes, although smaller to an extent, was nevertheless very important.

The main reason for these losses (and more particularly for the important losses taking place on the field), is that the fermentations in the manure were allowed totally or for the most part to proceed unhampered, the consequence being an important evolution of gases and an even more considerable oozing or trickling away of valuable substances. Statements made in this specification as regards losses in farmyard manures and as regards checking the same, also apply to other organic matter such as household refuse, town refuse and the like. The term farmyard manure is intended to cover all organic matter used as manure for agricultural or similar purposes.

The object of this invention is to turn to better account the plant nutrients contained in farmyard manure (carbon and nitrogen first and foremost) by suitably treating the said manure in the manure enclosure or in any other storage place in view of its future use. In other words, the invention aims at refining the material.

According to the invention the manure is first arranged in loose layers and fermentation is regulated by keeping a uniform degree of humidity therein. To that end, and according to the condition of the material, dry organic matter such as potato peelings, chaff, dry weeds, and if necessary thick-stemmed plant refuse or a watery liquid is added thereto. This fermentation is somewhat similar to that set up, according to known processes, in compressed fodder, but is very different in some important details and sometimes of an opposite kind. The purposes are indeed very different since this invention aims at producing manure easily assimilated by the soil and not at preserving fodder. The striking differences in details consist in that the decomposition of albuminoid substances is facilitated to form amides and the formation of acids is facilitated to bind the ammonia and split up the ash parts, while in the preservation of fodder, albumin is retained and the formation of acid excluded. The liquid or juice produced by fermentation has a great oozing or trickling power and was termed oozing juice. This juice is produced in the invention in order to be duly treated and used timely, whereas in the ordinary way the greatest part thereof soaks uselessly in the soil of the field. The invention takes into account the hitherto unheeded fact that the greatest part of the total loss of carbon and nitrogen in manure takes place in the manured soil in which wild fermentation is proceeding, so that certain advantages of fermentation are lost to the soil. According to the invention, certain stages of the fermentation of farmyard manure are brought under control in order not only to limit the above-mentioned losses as much as possible but also to provide the vegetable mould or black earth with a good proportion of chemically combustible substances (humus). In other words, the invention tends to increase the power of the soil.

Figure 2:
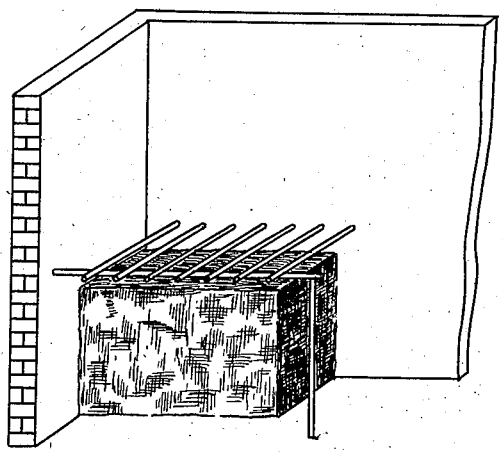

The material is loosely stratified to supply the fermentation agents with a sufficient quantity of air, that is to say of oxygen, in order that their growth may be rapid and that their work may be uniformly done in a short time. They are thus caused to work economically with regard to the nurture they consume. According to this invention, the main fermentation is completed within less than a week while the hitherto known methods of storing manure yielded after months but an imperfectly putrefied fermented material. Shields (Figure 1) or grates (Figure 2) and the like are used in refining farmyard manure when the dungheap reaches a certain height and when the material is heavy in order to prevent an excessive weight from acting on the said material and to provide a uniform loose stratification. As a rule the material is not spread over the whole area of the manure enclosure, as was done hitherto but arranged in uniform rectangular heaps the number and height of which are dependent upon the available quantity of material. The dimensions of the heaps must be such that the outer layer is as small as possible relatively to the whole contents, the height being limited by the fact that the weight of the upper layers is not to compress the material too much and thus exclude air therefrom. In order to keep up the correct fermentation temperature the proportion between the outer layer and the total contents is to be carefully observed for the purpose of lowering as much as possible the cooling action of the limiting faces as produced by diffusion, convection, solar radiation, rain, hoarfrost and the like.

The fermentation is supervised by chemical analysis, testing the buoyancy of the material and taking the temperature in each heap; the fermentation is modified according to the results or readings obtained. After the suitable temperature is obtained (namely 30–40° C. for tepid fermentation, 40–55° C. for warm fermentation and 55–65° C. for hot fermentation) and after the correct point of decomposition is reached, the material is pressed in order to prevent further fermentation by excluding air and any fermentation stimulants. The material may be trampled down, mechanically pressed or further quantities of manure may be piled upon it. The loss of heat of the said material is to be avoided as much as possible in order that it may be kept at a high temperature to loosen its fibrous structure.

The loosening of the fibrous structure is connected with a modification of the chemically combustible organic matter towards conversion into peat and fine division, the manuring power being thus increased. Consequently a considerable portion of the material is rendered assimilable for the bacteria of the soil and roots of plants before the said material is brought into the field. At the same time the "sorption" action is increased and the possibility of the lowering of the action of nitrogen by non-decomposed organic matter is precluded. Moreover the coarser parts converted to peat have lost their tendency to undergo further decomposition so that the material is rendered more stable. The above-described fermentation which is duly prepared, quickly carried out, continuously supervised and suitably regulated, acts upon the farmyard manure before it is applied to the soil, and under very economical conditions, especially as regards carbon and the nitrogen combined therewith. The refining of the material thus obtained mainly consists in that the refined manure is superior (as regards initial action and durability) to farmyard manure which, starting from exactly the same initial material, is treated in the ordinary way.

Figure 3:
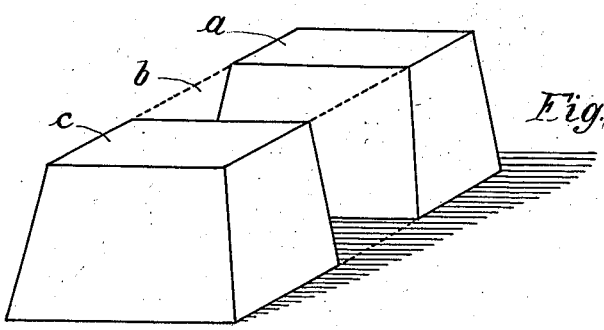
Figure 4:
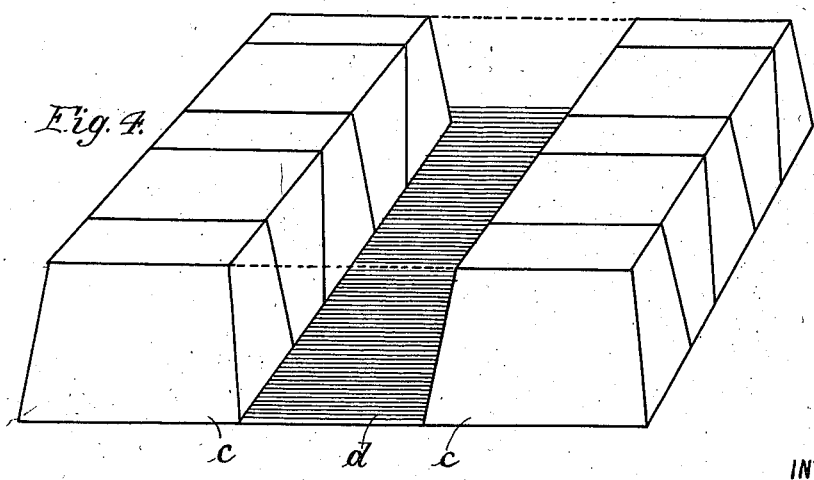

Further experiments have shown the following:

The material may be arranged for fermentation purposes so that the walls of the heaps are inclined to the vertical for the purpose of rendering the heap safer and for producing a gradually increased pressure in the band layers. Thus the initially made heaps for instance may be in the shape of a truncated pyramid (see Figure 3), further material being then placed in the intermediate space $b$ and acting as a wedge. The further heaping up may be made so that dams are first formed (see Figure 4) and the intermediate space $d$ is filled with wedge-like structures.

Further material is heaped on the pressed heaps; thus if for instance the fermentation proceeds slowly owing to meteorological conditions, a greater number of units of area are taken up by the material within the said period of time and with the supply remaining the same than if the fermentation were proceeding quicker. In the methods hitherto used, the manure was spread over the usual area of the manure enclosure with a complete disregard of loosening the layers as much as possible so that fresh manure was indiscriminately heaped on the other which very often had not sufficiently fermented, the lower layers being therefore pressed prematurely, the pressing being increased by the weight of the attendant spreading out the material. According to this invention of course, any premature loading of the material arranged in loose layers for producing a quickly setting-in and quickly proceeding fermentation must be absolutely avoided. Thus the pressed heaps adjacent to one another render the heaps under formation very accessible while the arrangement of the material in a vertical direction leaves a much greater area of the manure enclosure available, this being very useful when the fermentation proceeds slowly and when a greater number of fresh heaps are to be made in close succession. Consequently the lack of space in a long period of storage will be felt less acutely than hitherto.

In principle, however, the heaps must be made as high as possible in as short a period of time as possible by further heaping up fresh material on the pressed heaps by repeating the above-described operations. The methods hitherto known are limited to a piling up of farmyard manure to a man's height and even then very seldom in thin layers, so that a comparatively very considerable area is required, or owing to lack of space the material is dealt with regardless of the correct conditions required.

It results from the above that the piling up in height of the farmyard manure to be refined involves the following advantages: better utilization of the available area, smaller surface losses of the valuable fermenting material, higher average pressure on the same and better absorption of the oozing juices. The general heaping up is preferably carried out step by step.

The following steps may be taken to accelerate fermentation: The arrangement of a grate under the first layer of the material in order to prevent the oozing juices and other liquids from being dammed up, as these liquids detrimentally affect the fermentation by their high specific heat and by preventing the air from reaching the material. The heats in which fermentation is proceeding may be covered on their sides and at the top with light protective covering means for the purpose of reducing losses of heat or the like and for protecting the said material from meteorological and other influences.

Having now particularly described and ascertained the nature of my said invention and in what manner the same is to be performed, I declare that what I claim is:—

1. A process for refining farmyard manure, household and town refuse and the like which consists in heaping the material in loose layers to allow a rapid fermentation thereof and subjecting the material to pressure only to check the fermentation after the fermentation has been substantially completed.

2. A process for refining farmyard manure, household or town refuse and the like as set forth in claim 1 in which the humidity of the material at the initial stage is regulated as required.

3. A process for refining farmyard manure, household and town refuse and the like as set forth in claim 1 wherein the fermentation is substantially continuously controlled by the aid of thermometric observation to keep the temperature of the material from 30 to 40° C. for tepid fermentation and 40 to 50° C. for hot fermentation.

4. A process for refining farmyard manure, household refuse and the like which consists in successively heaping the material in loose layers to allow rapid fermentation thereof, and thereafter successively placing additional outer layers of said material in loosely piled condition upon the preceding layer when the fermentation of said preceding layer has been substantially completed, whereby the pressure of said outer layer will check the fermentation of the inner layer while the fermentation of the outer layer is proceeding.

In testimony whereof, I affix my signature.

H. KRANTZ.

Witnesses:
 ALEXIS PHILLIPPOFF,
 A. C. HOUGHTON.